United States Patent
Khodorkovsky

(10) Patent No.: US 7,343,508 B2
(45) Date of Patent: Mar. 11, 2008

(54) DYNAMIC CLOCK CONTROL CIRCUIT FOR GRAPHICS ENGINE CLOCK AND MEMORY CLOCK AND METHOD

(75) Inventor: Oleksandr Khodorkovsky, North York (CA)

(73) Assignee: ATI Technologies Inc., Markham, Ontario (CA)

(*) Notice: Subject to any disclaimer, the term of this patent is extended or adjusted under 35 U.S.C. 154(b) by 729 days.

(21) Appl. No.: 10/794,201

(22) Filed: Mar. 5, 2004

(65) Prior Publication Data

US 2005/0195181 A1 Sep. 8, 2005

(51) Int. Cl.
*G06F 1/04* (2006.01)

(52) U.S. Cl. .............. 713/500; 713/400; 713/401; 713/600; 345/500; 345/519

(58) Field of Classification Search ........... 713/500
See application file for complete search history.

(56) References Cited

U.S. PATENT DOCUMENTS

| | | | |
|---|---|---|---|
| 5,544,101 A | 8/1996 | Houston |
| 5,615,376 A | 3/1997 | Ranganathan |
| 5,675,808 A | 10/1997 | Gulick et al. |
| 5,752,045 A | 5/1998 | Chen |
| 5,781,496 A | 7/1998 | Pinkham et al. |
| 5,781,768 A | 7/1998 | Jones, Jr. |
| 5,804,749 A | 9/1998 | Shirakawa et al. |
| 5,835,435 A | 11/1998 | Bogin et al. |
| 5,907,330 A | 5/1999 | Simmers |
| 5,991,883 A | 11/1999 | Atkinson |
| 6,067,083 A | 5/2000 | Glen et al. |
| 6,073,223 A | 6/2000 | McAllister et al. |
| 6,079,025 A | 6/2000 | Fung |
| 6,112,310 A | 8/2000 | Jun et al. |
| 6,177,946 B1 | 1/2001 | Sinclair et al. |
| 6,209,075 B1 | 3/2001 | Lau |
| 6,263,448 B1 | 7/2001 | Tsern et al. |
| 6,292,201 B1 | 9/2001 | Chen et al. |
| 6,307,281 B1 | 10/2001 | Houston |
| 6,460,125 B2 | 10/2002 | Lee et al. |
| 6,657,634 B1 | 12/2003 | Sinclair et al. |
| 6,820,209 B1 * | 11/2004 | Culbert et al. ............. 713/501 |
| 2001/0032321 A1 | 10/2001 | Nanno et al. |
| 2002/0093478 A1 | 7/2002 | Yeh |

OTHER PUBLICATIONS

International Search Report from European Patent Office; International Application No. PCT/IB2005/000566; dated Nov. 2, 2005.

* cited by examiner

*Primary Examiner*—Nitin C. Patel
(74) *Attorney, Agent, or Firm*—Vedder, Price, Kaufmann & Kammholz, P.C.

(57) ABSTRACT

A variable clock control information generator receives graphics engine activity data relating to the operating level of a graphics engine, and memory activity data relating to an activity level of memory. In response, the variable clock control information generator produces graphics engine clock control information and memory clock control information with respect to each other, such that a relative difference between the graphics engine activity data and the memory activity data is within balance threshold data. Accordingly, the variable clock control information generator adapts to the varying levels of graphics engine activity and memory activity and adjusts the frequency of the graphics engine clock signal and the frequency of the memory clock signal to achieve a balanced relative activity level.

26 Claims, 5 Drawing Sheets

DYNAMIC CLOCK CONTROL CIRCUIT FOR GRAPHICS ENGINE CLOCK AND MEMORY CLOCK AND METHOD

FIELD OF TEE INVENTION

The invention relates generally to processor systems and, more particularly, to clock control circuits for processor systems.

BACKGROUND OF THE INVENTION

Portable electronic devices, such as notebook computers, personal organizers, portable telecommunication equipment and other processor-based devices consume much power during their display mode. Portable computers, and other processor-based devices, are known to include a central processing unit (CPU), video graphics circuitry, system memory and other peripheral circuits. In such computers, the central processing unit functions as a host processor while the video graphics circuitry (e.g., a graphics coprocessor) functions as a loosely coupled coprocessor. By way of example, the video graphics circuitry may be an integrated circuit on a single semiconductor die, such as an application specific integrated circuit (ASIC).

The power dissipation and performance characteristics of the CPU, video graphics circuitry, system memory and other integrated circuits are typically related to an operating frequency of a clock signal. Although the performance of the video graphics circuitry increases as the operating frequency of the clock signal increases, the video graphics circuitry also increases power consumption and generates more heat. Typically, the operating frequency of the clock signal is limited to a maximum clock frequency commonly referred to as a nominal operating frequency.

The video graphics circuit includes a phase lock loop (PLL) circuit to generate a clock signal for the video graphics coprocessor (graphics engine), the graphics memory and a display device (or devices), such as a CRT, that a user may plug into the laptop computer or an LCD display that is mounted to the laptop computer. As is known in the art, the graphics engine may include another PLL circuit for generating a corresponding graphics engine clock signal, other than the memory clock signal.

Power consumption and thermal dissipation needs to be minimized for portable devices without unnecessarily sacrificing operational performance. Operational performance for a portable device may include display operations and video playback requiring real-time processing, such as video capture operation, so that real-time display occurs on the LCD display, or any suitable display device. For example, where a game application or a TV tuner is providing a video signal to the video capture engine, the video signal should be processed in real time to facilitate display in real time. Hence, the video capture engine has a higher priority over a 2D or 3D drawing engine, which may be slightly delayed and still provide the user with high performance on display times. The need for minimizing power consumption without unnecessarily sacrificing operational performance also arises for nonportable devices due to increased circuit density and increased clock speeds.

FIG. 1 shows, by way of example, a block diagram of a video graphics system 2 used in computer devices, such as a laptop computer, a handheld processing device, and a telecommunication device or any other suitable portable display device that generates graphics and/or video display information to a display device and employs system level standby/suspend power management control. When the device is a laptop computer, such a device typically includes an operating system 4 that operates under control of a host CPU 6, which then provides suspend/standby command data 22 to a power management control system 12. The operating system 4 generates suspend/standby command data 22 when, for example, the laptop computer is in a standby/suspend mode, as activated through a graphic user interface, software controlled timer, switch or other trigger event. A memory controller 16 receives inactive mode suspend/standby command data 14 and in response provides clock enable/disable data 18 to, for example, control a memory clock enable pin (and/or other pins) on memory 20 with selectable power consumption modes to put the memory 20 in a self-refresh mode during the system level standby/suspend mode (e.g., the inactive mode). The memory 20 may be, for example, a dynamic RAM (DRAM) synchronous memory, such as synchronous dynamic RAM (SDRAM) or synchronous graphics RAM (SGRAM) or any other suitable graphics and/or video memory device. This memory may reside on the same semiconductor die (ASIC) as the video graphics system 2, or it may be separate and connected through board level or package level traces.

Memory request engines 24 also include, for example, a 2D/3D GUI memory engine 26, display engine 28, host CPU 6, video request engine 30, onboard SDRAM, SGRAM or other RAM, serving as the frame buffer memory within the memory 20, and other devices not shown, such as a video capture engine and a video playback engine. Accordingly, the power management control system 12 can disable the memory clock for memory 20 during suspend and standby modes to reduce the power consumption of the video graphics system 2, which includes the synchronous memories used for frame buffer operations. However, the power management control system 12 typically only places the memory 20 in a low power mode when the video graphics system 2 is completely idle, by turning off the memory clock and other clocks during the suspend mode. When the operating system 4 indicates that the display is in the active mode (e.g., the display is enabled), the memory 20 is typically always enabled and the memory clock is always running at a nominal operating frequency.

Other graphics processing circuits are known that have activity-based power reduction by turning off, for example, a graphics user interface clock to a GUI generating engine, and a three-dimensional rendering engine clock to the 3D engine when the 3D engine is not being used. This power reduction is typically performed because the 3D engine, when operational, can consume large amounts of processing capability of the graphics processing circuitry. Consequently, branches from a common engine clock are selectively turned off based on an activity level. However, this power reduction technique is typically performed for only larger processing engines, such as 3D engines. In addition, where the engines utilize different clock branches, only one clock branch, such as an engine clock, is controlled. Consequently, the memory clock in the memory is typically allowed to continue to operate independently, thus consuming power.

According to another method, a system detects memory access demand, and automatically adjusts memory operation accordingly to facilitate power reduction. The system typically adjusts memory operation based on memory read requests, as well as condition data such as when a display is enabled, the graphics engine is active, a subpicture or video overlay is enabled, and a video capture operation is enabled. However, this method is limited to adjusting memory operation based on memory read requests. Consequently, the graphics engine is active and its activity level is not varied when memory activity levels are varied.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE PREFERRED EMBODIMENTS

Figure 1:
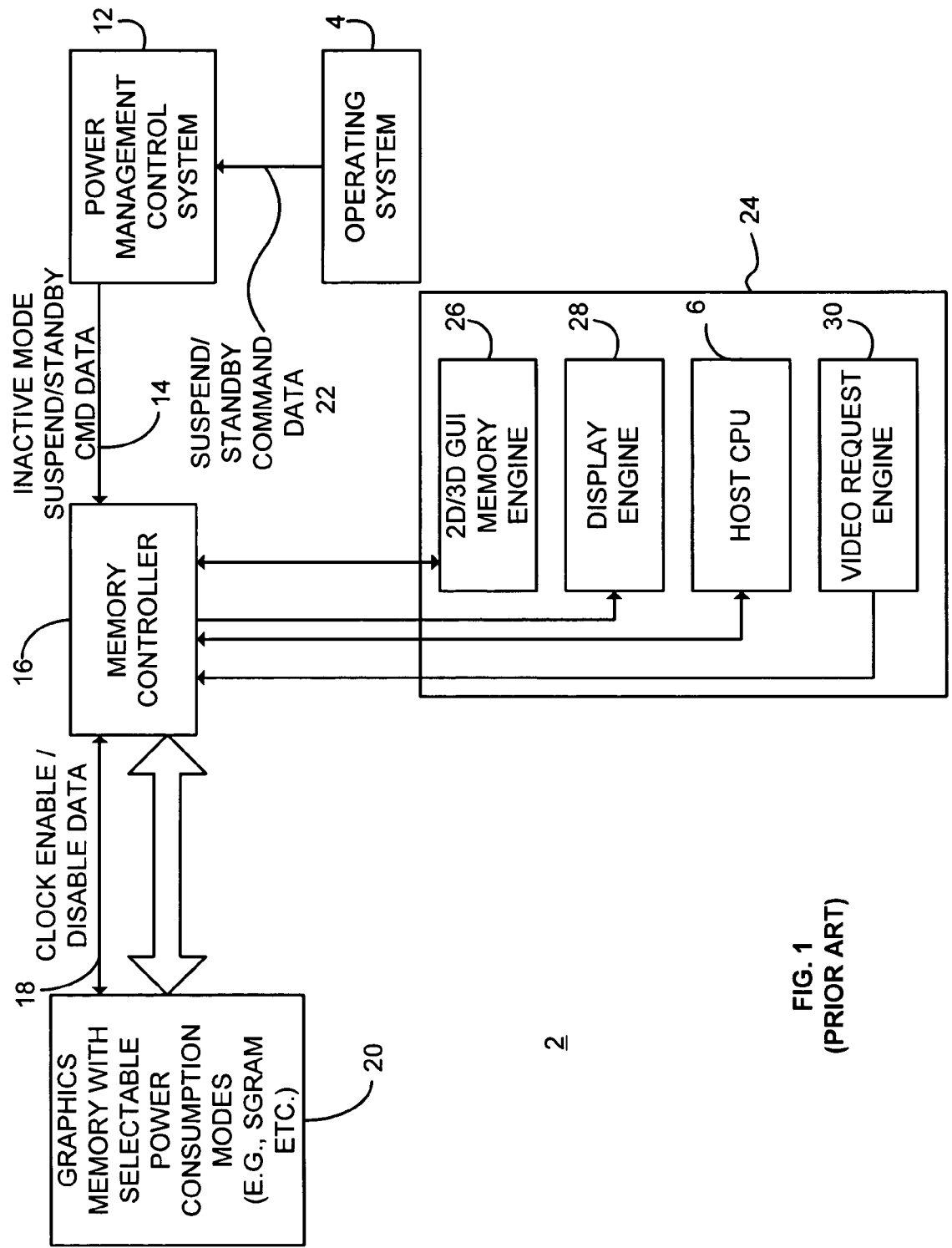
FIG. 1 is a block diagram generally illustrating a conventional graphics accelerator circuit.

A variable clock control information generator receives graphics engine activity data relating to the operating level of a graphics engine, and memory activity data relating to an activity level of memory. In response, the variable clock control information generator produces graphics engine clock control information and memory clock control information with respect to each other, such that a relative difference between the graphics engine activity data and the memory activity data is within balance threshold data. A graphics engine clock signal generator receives the graphics engine clock control information and in response controls an operating frequency of a graphics engine clock signal. Similarly, a memory signal clock generator receivers the memory clock control information and in response controls an operating frequency of a memory clock signal. The variable clock control information generator adapts to the varying levels of graphics engine activity and memory activity and adjusts the frequency of the graphics engine clock signal and the frequency of the memory clock signal to achieve a balanced relative activity level.

Among other advantages, the variable clock information generator effectively balances the operating level of the graphics engine and of the memory, such that neither the graphics engine nor the memory consumes power unnecessarily. As a result, the graphics engine does not operate at a level higher than the operating level of the memory, and similarly, the memory does not operate at a level that is higher than the graphics engine, since the operating levels of the graphics engine and the memory are relatively balanced. By balancing the operating level of the graphics engine and the memory with respect to each other, neither the graphics engine nor the memory operate at an unnecessarily high level, thus reducing overall power consumption. In other words, the variable clock information generator may vary the operating levels of the graphics engine and the memory in order to adapt to the varying levels of workload, such that an appropriate amount of power is supplied to the graphics engine and the memory in accordance to their respective work loads demands. As a result, the variable clock information generator reduces power consumption and therefore further increases battery life in a portable computer and reduces thermal dissipation.

According to one embodiment, if either the graphics engine or the memory are operating below, at or near their maximum operating levels, then the variable clock information generator may increase the operating level of the slower device in order to provide the necessary balance of enhanced performance between the graphics engine and the memory. For example, the variable clock information generator may temporarily increase the operating level of the slower device above a nominal operating level, such as a nominal operating frequency of the graphics engine clock signal or the memory clock signal, in order to improve the overall performance of the computer system without harming the memory or the graphics engine.

Figure 2:
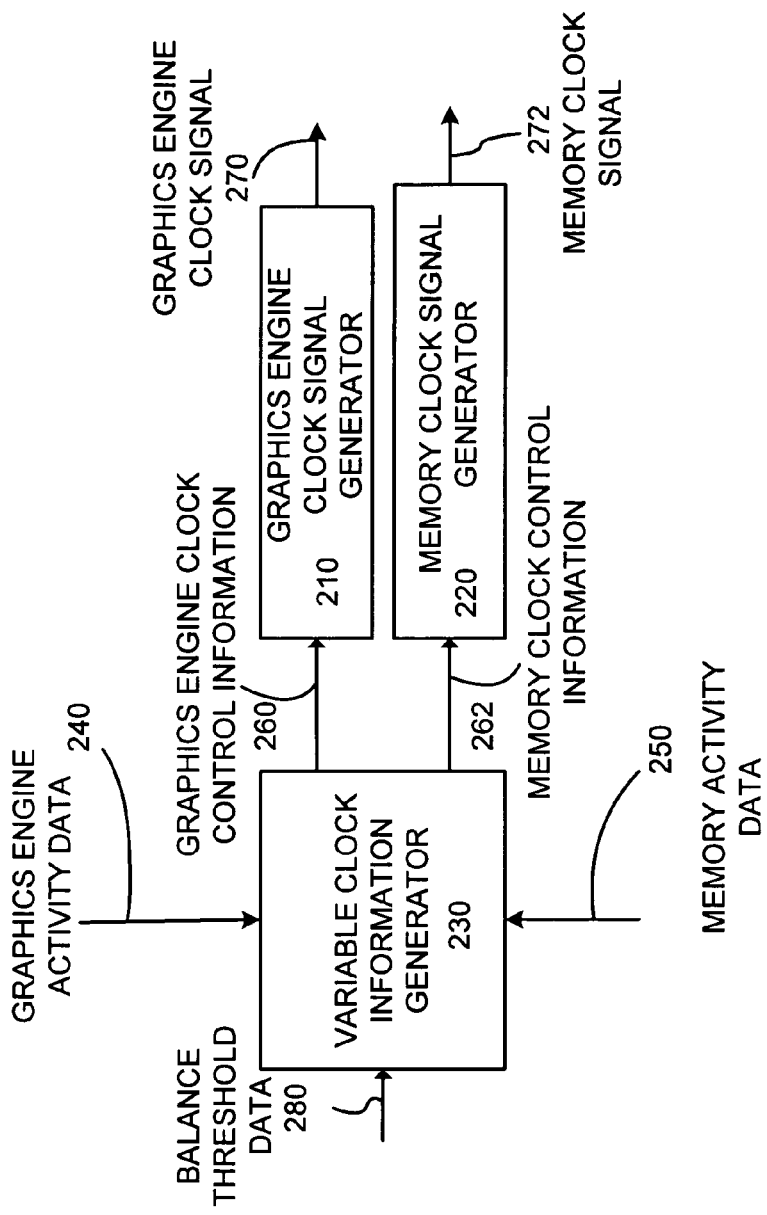
FIG. 2 is a block diagram illustrating one example of a dynamic clock control circuit in accordance with one exemplary embodiment of the invention.

FIG. 2 is a blocked diagram of a clock control system 200 including a graphics engine clock signal generator 210, a memory clock signal generator 220, and a variable clock information generator 230. The variable clock control information generator 230 receives graphics engine activity data 240 and memory activity data 250, and in response produces graphics engine clock control information 260 and memory clock control information 262. The graphics engine clock signal generator 210 receives the graphics engine clock control information 260 and in response produces a graphics engine clock signal 270. The memory clock signal generator 220 receives the memory clock control information 262, and in response generates the memory clock signal 272. The variable clock control information generator 230 produces the graphics engine clock control information 260 and the memory clock control information 262 with respect to each other, such that a relative difference between the received graphics engine activity data 240 and the received memory activity data 250 is within balanced threshold data to represent a balanced relative activity level.

The variable clock information generator 230 may be one or more suitably programmed processors, such as a microprocessor, a microcontroller or a digital signal processor and, therefore, includes associated memory that contains executed instructions that, when executed, cause the variable clock information generator 230 to carry out the operations described herein. In addition, the variable clock information generator 230, as used herein, includes discrete logic, state machines or any other suitable combination of hardware, software and/or firmware.

The various elements of the clock control system 200 are linked by a plurality of links. The links may be any suitable mechanisms for conveying electrical signals or data as appropriate. According to one embodiment, the interface between the variable clock information generator 230, the graphics engine clock signal generator 210 and the memory clock signal generator 220 may be a host processor to graphics co-processor interface, such as a PCI bus, an AGP bus, a PCI-express bus, an I$^2$C (IC to IC) bus or any other suitable type of bus, either standardized or proprietary. Alternatively, the interface between the variable clock information generator 230, the graphics engine clock signal generator 210 and the memory clock signal generator 220 may be an integrated circuit interconnection within an application specific integrated circuit (ASIC).

The graphics engine clock signal generator 210 and the memory clock signal generator 220 may include one or more phase lock loop circuits, including a divider register, as is known in the art, for varying a frequency of the graphics engine clock signal 270 and the memory clock signal 272. For example, the divider register within the phase lock loop circuit controls the frequency of the graphics engine clock signal 270 and the memory clock signal 272, as is known in the art.

The graphics engine activity data 240 and the memory activity data 250 may relate to the idle level or busy level of the graphics engine or the memory, respectively. For example, the graphics engine activity data 240 may be determined based on a percentage busy level where zero percent may represent an idle level of operation for the graphics engine and 100% may relate to a maximum busy level of operation for the graphics engine. According to one embodiment, the graphics engine activity data 240 relating to 100% busy may indicate a maximum rated level of performance for the graphics engine corresponding to operation at a nominal clock operating frequency. Similarly, the memory activity data 250 may indicate a percentage idle level of operation and a busy level of operation.

The graphics engine activity data 240 and the memory activity data 250 may be any suitable parameter or value for indicating the level of activity or level of performance of the graphics engine or the memory such that the variable clock information generator 230 may balance the level of operation of the graphics engine and the memory. According to one embodiment, the graphics engine activity data 240 and the memory activity data 250 may relate to an average activity level averaged over a period of time. For example, the period of time may be any suitable period of time in order to sample the average activity level of the graphics engine and the memory, such as a fraction of a second, one second, five seconds, ten seconds or more.

Figure 3:
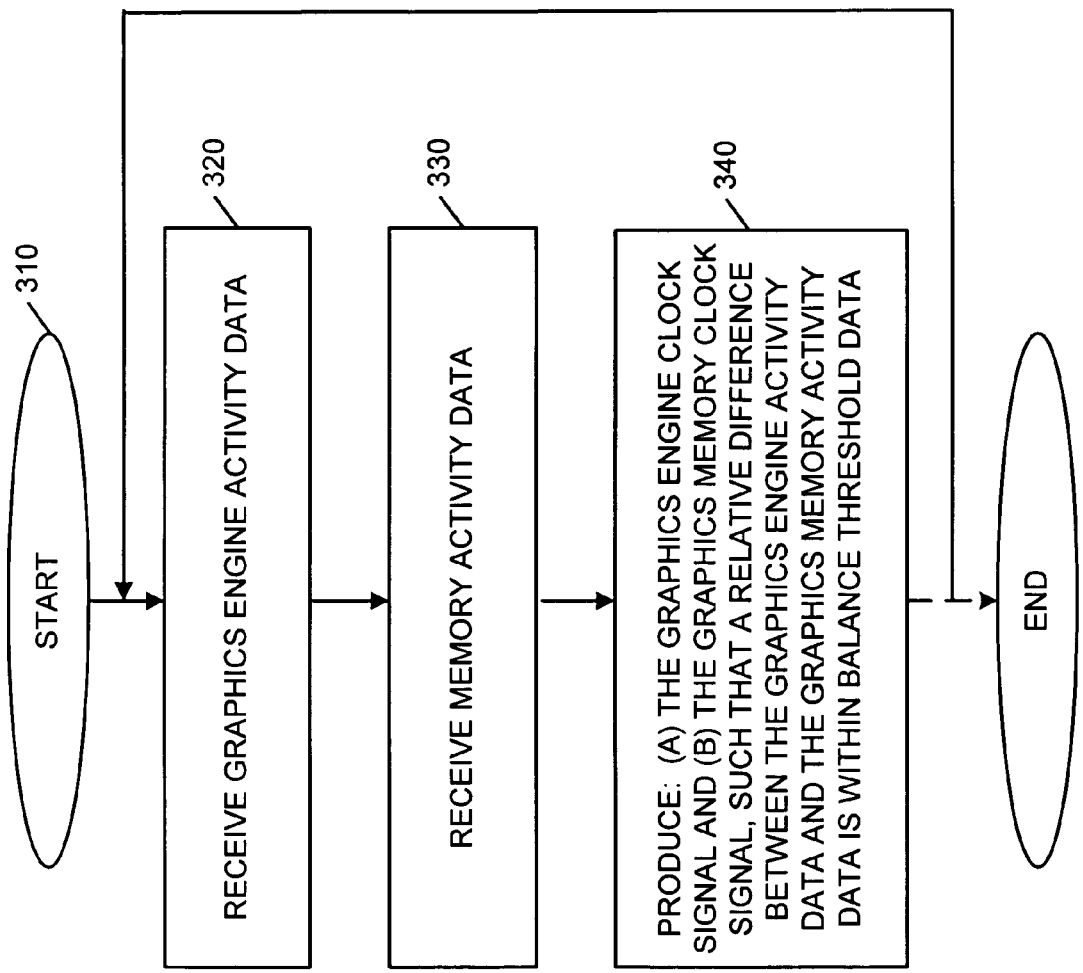
FIG. 3 is a flowchart illustrating one example of a method for generating a clock signal according to one exemplary embodiment of the invention.

FIG. 3 illustrates a method for balancing the graphics engine activity data 240 and the memory activity data 250 in order to reduce power consumption or increase system performance in accordance with one exemplary embodiment of the invention. The method may be carried out by the clock control system 200. However, any other suitable structure may also be used. It will be recognized that method, beginning with step 310, will be described as a series of operations, but the operations may be performed in any suitable order and may be repeated in any suitable combination.

As shown in step 320, the variable clock information generator 230 receives the engine activity data 240. The graphics engine activity data 240 may be provided in any suitable format as previously discussed.

As shown in step 330, the variable clock information generator 230 receives the memory activity data 250. The memory activity data 250 may also be in any suitable format.

As shown in step 340, the variable clock information generator 230 produces the graphics engine clock control information 260 and in response varies an operating frequency of the graphics engine clock signal 270 and also produces the memory clock control information 262 and in response varies an operating frequency of the memory clock signal 272. In response to receiving the graphics engine activity data 240 and the memory activity data 250, the variable clock information generator 230 produces the graphics information clock control information 260 and the memory clock control information 262 with respect to each other such that a relative difference between the graphics engine activity data 240 and the memory activity data 250 is within the balance threshold data 280 in order to represent a balanced relative activity level.

A nominal operating frequency of the graphics engine clock signal 270 is typically established by the manufacturer and corresponds to the maximum operating frequency of the graphics engine clock signal 270. Accordingly, the frequency of the graphics engine clock signal 270 may be reduced from the nominal operating frequency, for example, to reduce the power consumption for the graphics engine. Alternatively, the frequency of the graphics engine clock signal 270 may be temporarily increased above the nominal operating frequency in order to provide increased performance to meet a temporary increase of processing demand. The operating frequency of the memory clock signal 272 may be increased if the operating frequency was previously reduced in order to provide increased operating performance.

Figure 4:
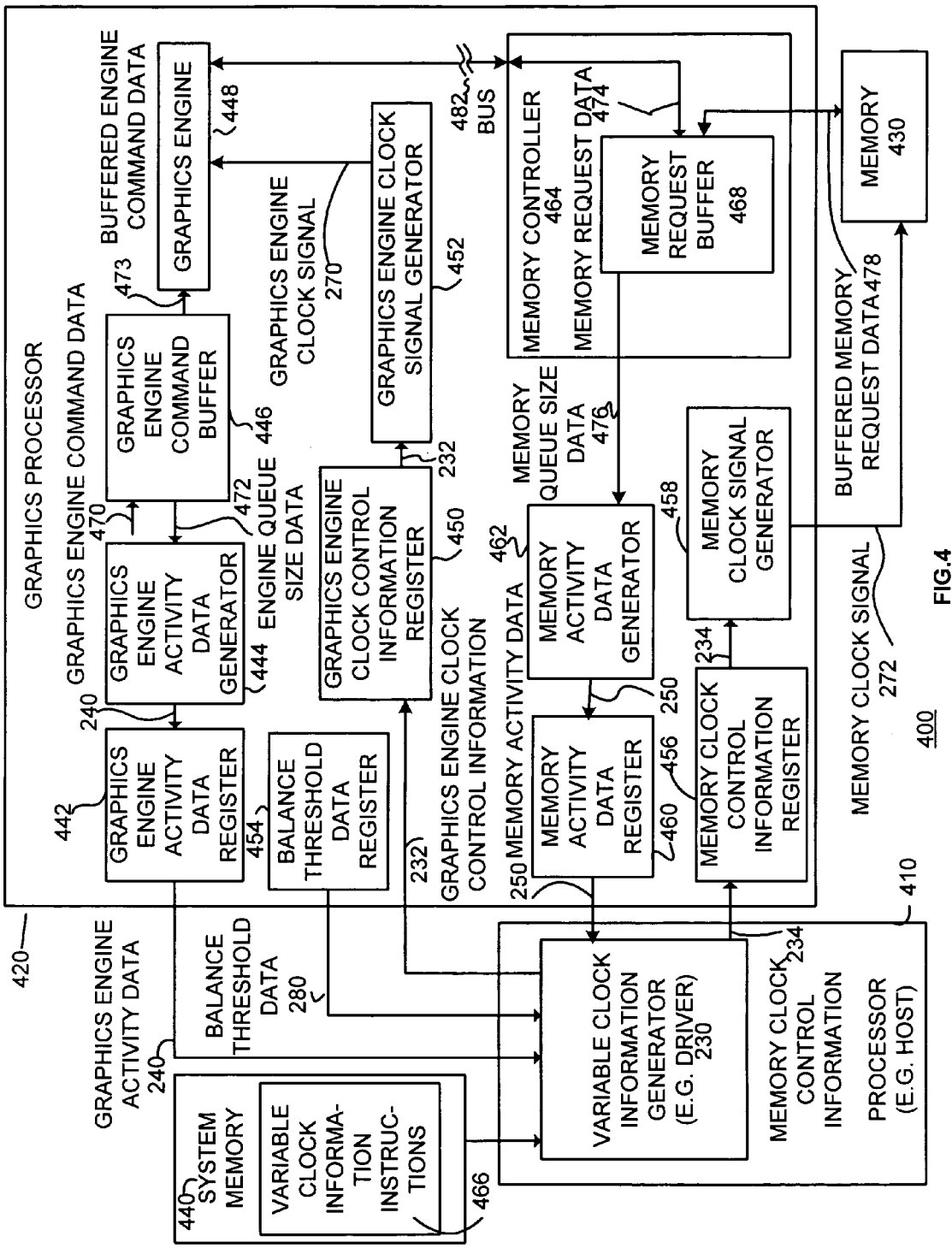
FIG. 4 is a block diagram illustrating another example of the clock control circuit in accordance with another exemplary embodiment of the invention.

FIG. 4 illustrates one embodiment of a clock control system 400 in accordance with another exemplary embodiment of the invention. The clock control system 400 includes a processor 410, a graphics processor 420, memory 430 and system memory 440. The graphics processor 420 includes a graphics engine activity register 442, a graphics activity generator 444, a graphics engine command buffer 446, a graphics engine 448, a graphics engine clock control information register 450, a graphics engine clock signal generator 452, a balance threshold data register 454, a memory clock control information register 456, a memory clock signal generator 458, a memory activity data register 460, a memory activity data generator 462 and a memory controller 464. The memory controller 464 includes a memory request buffer 468.

According to this embodiment, the variable clock information generator 230 represents a driver or any suitable executable software program operating in the processor 410, such as a host processor. For example, the processor 410 executes variable clock information instructions 466 contained in system memory 440 that causes the processor 410 to vary the graphics engine clock signal 270 and the memory clock signal 272, as previously described.

The various elements of the clock control system 400 are linked by a plurality of links. The links may be any suitable mechanisms for conveying electrical signals or data as appropriate. According to one embodiment, the interface between the processor 410 and the graphics processor 420 may be a host processor to graphics co-processor interface, such as a PCI bus, an AGP bus, a PCI-express bus, an I$^2$C (IC to IC) bus or any other suitable type of bus, either standardized or proprietary. The interface between the processor 410 and the memory 430 may be a PCI bus, an AGP bus, a PCI-express bus, an I$^2$C (IC to IC) bus or any other suitable type of bus. Alternatively, the interface between the processor 410, the graphics processor 420, system memory 440 and the memory 430 may be an integrated circuit interconnection within an application specific integrated circuit (ASIC). Graphics engine 448 may be coupled to memory 430 via bus 482 such as an AGP bus, a PCI-express bus, an I$^2$C (IC to IC) bus, an integrated circuit interconnection within an application specific integrated circuit (ASIC) or any other suitable type of bus, either standardized or proprietary.

The graphics engine command buffer 446 receives the graphics engine command data 470, and in response generates the engine queue size data 472 and buffered engine command data 473. In response, the graphics engine activity data generator 444 receives the engine queue size data 472 and generates the graphics engine activity data 240 based on an average of the engine queue size data 472 determined over a first period of time. Similarly, the memory request buffer 468 receives the memory request data 474 and in response generates memory queue size data 476 and buffered memory request data 478. The memory activity data generator 462 receives the memory queue size data 476 and generates the memory activity data 250 based on an average of the memory queue size data 476 determined over a second period of time. According to one embodiment, the first period of time and the second period of time are the same, although they can also be different.

According to one embodiment, the graphics engine activity generator 444 includes a hardware-based activity meter suitable to generate the graphics engine activity data 240. Similarly, the memory activity data generator may include a memory activity meter in order to generate the memory activity data 250. The graphics engine activity data 240 may be determined over a period of time by calculating the number of clock cycles that the graphics engine 448 is busy and dividing by the total number of cycles during the averaged time period. The memory activity data 250 is similarly calculated. The percentage busy level may be calculated by the following formula:

$$\frac{\text{Number of Clock Cycles Busy}}{\text{Total Number of Cycles in the Averaged Time Period}} = \% \text{ Busy.}$$

Similarly, a percentage of idle cycles to total number of cycles may be similarly calculated:

$$\frac{\text{Number of Clock Cycles Idle}}{\text{Total Number of Cycles in the Averaged Time Period}} = \% \text{ Idle.}$$

Therefore, within a sample time period of a fixed number of clock cycles, each clock cycle may be designated as either an idle clock cycle or a busy clock cycle. As shown above, the graphics engine activity data 240 and the memory activity data 250 may be based on the number of busy clock cycles divided by the total number of clock cycles in the sample period. Accordingly, the graphics engine activity data 240 and the memory activity data 250 may be represented as a percentage of maximum processing capacity.

A particular clock cycle for the graphics engine 448 may be busy if, for example, the graphics engine command buffer 446 is not empty for that particular clock cycle as known in the art. A particular clock cycle for the memory 430 may be busy if the memory request buffer 468 is not empty for a particular clock cycle as is known in the art. For example, the memory request data 474 may represent a memory access request, such as a write or a read access request that is then stored in the memory request buffer 468.

The variable clock information generator 230 receives both the graphics engine activity data 240 and the memory activity data 250 and compares them to determine if their relative level of activity is within the balance threshold data 280. If, for example, either the graphics engine 448 or the memory 430 processes more idle cycles, then the device processing more idle cycles may be slowed down since the current level of capacity for that device is not necessary. In other words, the faster device may be slowed down so that power consumption may be reduced while maintaining an appropriate level of processing capacity for both the graphics engine 448 and the memory 430.

According to an alternative embodiment if, however, both the graphics engine 448 and the memory 430 are both operating at relatively low levels of processing capacity as indicated by the graphics engine activity data 240 and the memory activity data 250, then the variable clock information generator 230 may reduce the levels of operating performance for both the graphics engine 448 and the memory 430 to an appropriate level such that both the graphics engine 448 and the memory 430 meet the required performance and capacity criteria. As a result, the processing capacity of the graphics engine 448 and the memory 430 may be adapted to varying processing demands rather than operating the graphics engine 448 and the memory 430 at their maximum levels of processing capacity. As a result, the variable clock information generator 230 may balance the levels of processing capacity between the graphics engine 448 and the memory 430 and also dynamically adjust the processing capacity of the graphics engine 448 and the memory 430 depending on both the absolute and relative levels of workload required of each device.

According to one embodiment, the variable clock information generator 230 may determine when the graphics engine activity data 240 and the memory activity data 250 are balanced or not and therefore may take appropriate action, as discussed above, to cause the variable clock information generator to adjust the nominal operating frequencies of the graphics engine clock signal 270 and the memory clock signal 272. For example, the variable clock information generator 230 may periodically poll the graphics engine activity data register 442 and the memory activity data register 460 to determine if the graphics engine activity data 240 and the memory activity data 250 are balanced. Similarly, the host processor 410 the memory clock signal generator 458 or the graphics engine clock signal generator 452 may poll periodically, or during any suitable nonperiodic or periodic period of time. Alternatively, the graphics engine clock signal generator 452 and the memory clock signal generator 458 or any other suitable circuit, may provide an interrupt control signal to the host processor 410 via a general purpose input/output (GPIO) interface, as is well known in the art when new graphics engine activity data 240 and/or memory activity data 250 are generated. The variable clock information generator 230 may also monitor, for example, the rate of change of the graphics engine activity data 240 and the memory activity data 250.

According to one embodiment, the variable clock information generator 230 varies the operating frequency of the graphics engine clock signal 270 and the operating frequency of the memory clock signal 272 such that a change in frequency is a smooth transition through one or more intermediate frequencies over a transition time. For example, the variable clock information generator 230 may provide multiple intermediate operating frequency ranges for the graphics engine clock signal 270 and the memory clock signal 272 by a look up table so that the graphics engine clock signal 270 and the memory clock signal 272 may be transitioned in a suitable manner. For example, the look up table may be programmed with actual intermediate operating frequencies so that the graphics engine clock signal 270 and the memory clock signal 272 change in a discrete fashion. According to another embodiment, the look up table may include an equation or algorithm such that the graphics engine clock signal 270 and the memory clock signal 272 vary in a continuous or approximately continuous fashion.

The graphics engine clock signal generator 452 and the memory clock signal generator 458 may each include a phase lock loop circuit in order to provide the desired frequency for the graphics engine clock signal 270 and the memory clock signal 272. As is known in the art, the phase lock loop circuit may generate a variable frequency to produce the graphics engine clock signal 270 and the memory clock signal 272 through the use of a variable feedback divider circuit. Accordingly, the frequency of the graphics engine clock signal 270 and the memory clock signal 272 may be varied by loading the graphics engine clock control information 232 and the memory clock control information 234 into a feedback register for the corresponding feedback divider circuit of the phase lock loop. As a result, the variable clock information generator 230 may load an appropriate value into the feedback register to dynamically change the graphics engine clock signal 270 and the memory clock signal 272.

According to one embodiment, the feedback divider circuit is a fractional divider to provide the ability to change the graphics engine clock signal 270 and the memory clock signal 272 to any suitable desired frequency. Accordingly, the frequency of the graphics engine clock signal 270 and the memory clock signal 272 may be changed with any suitably sized steps to produce the intermediate frequencies to ensure that the graphics engine 448 and the memory 430 do not experience a discontinuity in processing, for example. Therefore, the feedback divider in the phase lock loop may be controlled such that changes in the frequency of the graphics engine clock signal 270 and the memory clock signal 272 occur without a major disruption in the clock signals. Additionally, the phase lock loop may be changed quickly to react to sudden changes in the balance of the memory activity data 250 and the graphics engine activity data 240. Further, the variable clock information generator 230 may change the feedback divisor value in the phase lock loop circuit without stopping either the graphics engine clock signal 270 or the memory clock signal 272 such that the avoidance of any disruptions in processing avoids freezing of display images and also avoids jerkiness and motion on the display image.

Figure 5:
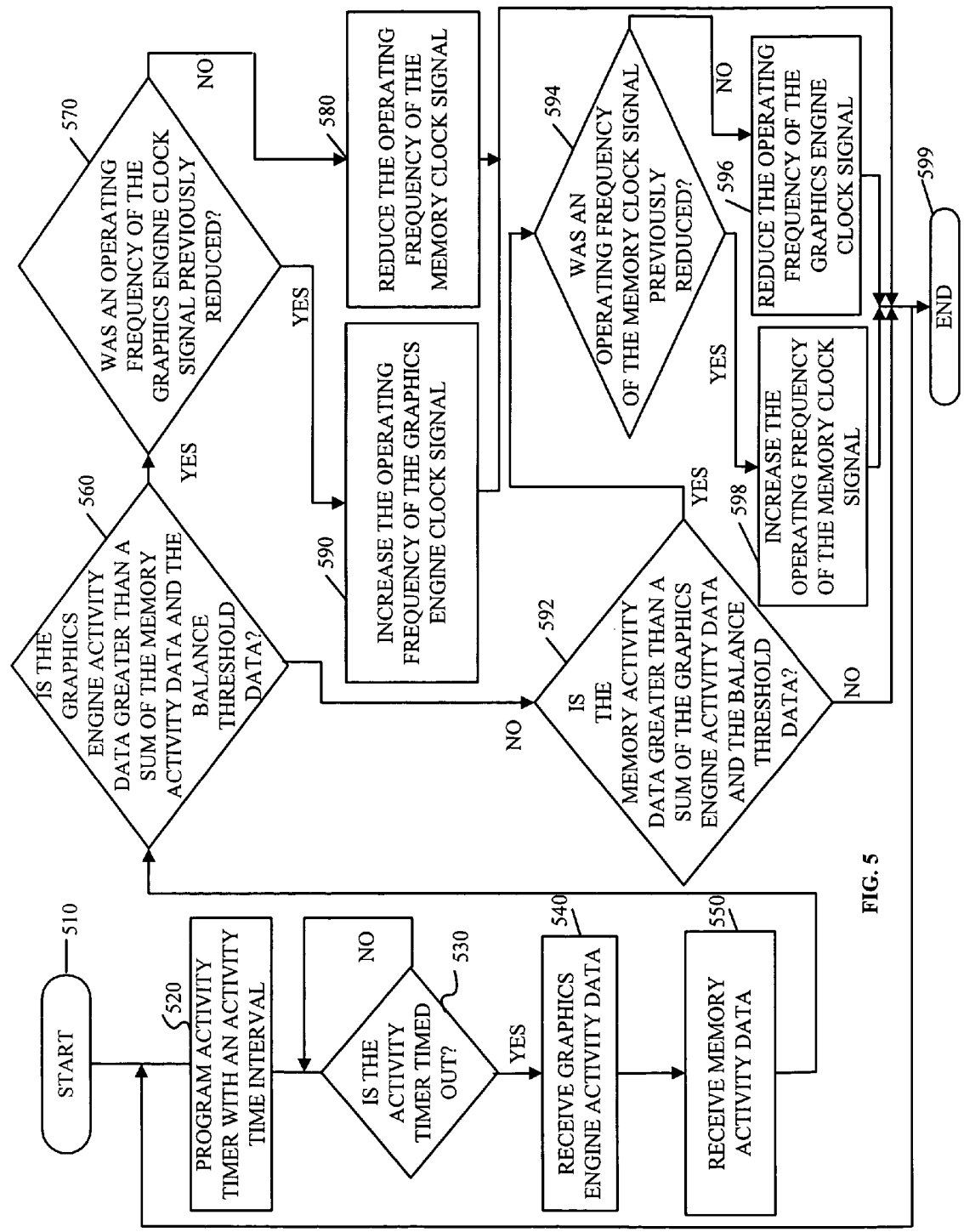
FIG. 5 is a flowchart illustrating another example of a method for controlling a graphics engine clock signal and a memory clock signal in accordance with another exemplary embodiment of the invention.

FIG. 5 illustrates the method for either increasing or decreasing the operating frequency of the graphics engine clock signal 270 and the memory clock signal 272 in order to reduce power consumption or enhance system performance in accordance with another exemplary embodiment of the invention. The method may be carried out by the clock control system 200, 400, however, any other suitable structure may also be used. The method, beginning with step 510, will be described as a series of operations, but the operations may be performed in any suitable order and may be repeated in any suitable combination.

As shown in step 520, the variable clock information generator 230 programs an activity timer with activity timer interval data. For example the variable clock information generator 230 may activate any suitable activity timer within processor 410 as is known in the art. Accordingly, the activity timer then counts down from the amount of time corresponding to the activity timer interval data, as is well known.

As shown in step 530, the variable clock information generator 230 determines if the activity timer has timed out. If the activity timer has not timed out, then the count down continues. Steps 540 and 550 were described previously with respect to steps 320 and 330 of FIG. 3.

As shown in step 560, the variable clock information generator 230 determines if the graphics engine activity data 240 is greater than a sum of the memory activity data 250 and the balance threshold data 280. Any other suitable relationship between the graphics engine activity data 240, the memory activity data 250 and the balance threshold data 280 may be used. For example, the variable clock information generator 230 may determine if the memory activity data is less than the graphics engine activity data 240 minus the balance threshold data 280.

As shown in step 570, the variable clock information determines if the operating frequency of the graphics engine clock signal 270 was previously reduced. For example, the operating frequency of the graphics engine clock signal 270 may have been previously reduced in order to balance the operating level of the graphics engine 448 with the memory 430.

As shown in step 580, the variable clock information generator 230 reduces the operating frequency of the memory clock signal 272. For example, since the graphics engine activity data 240 is greater than the sum of the memory activity data 250 and the balance threshold data 280, then the memory activity data 250 indicates that the graphics engine 448 is essentially busier than the memory 430 as indicated by the graphics engine activity data 240. In other words, since the graphics engine activity data 240 indicates that the graphics engine 448 is busier than the memory 430, the variable clock information generator 230 will reduce the operating frequency of the memory clock signal 272 in order to reduce the level of performance of the memory 430. Therefore, the memory 430 will consume less power as a result of the reduced nominal operating frequency of the memory clock signal 272.

As shown in step 590, the variable clock information generator 230 increases the operating frequency of the graphics engine clock signal 270 when the graphics engine activity data 240 is greater than a sum of the memory activity data 250 and the balance threshold data 280. For example, since the graphics engine 448 is the bottleneck, performance may be increased by increasing the operating frequency of the graphics engine clock signal 270. The operating frequency of the graphics engine clock signal 270 is increased if previously the variable clock information generator 230 reduced the operating frequency of the graphics engine clock signal 270. Accordingly, the variable clock information generator 230 may increase the operating frequency of the graphics engine clock signal 270 up to the nominal operating frequency of the graphics engine clock signal 270. According to another embodiment, the operating frequency of the graphics engine clock signal 270 may be increased temporarily above the nominal clock operating frequency under certain parameters such that permanent damage to the graphics engine 448 is avoided, such as increasing the junction temperature of the graphics engine 448 temporarily beyond a maximum operating junction temperature.

As shown in step 592, the variable clock information generator 230 determines if the memory activity data 250 is greater than a sum of the graphics engine activity data 240 and the balance threshold data 280. If the operating level of the graphics engine 448, as represented by the graphics engine activity data 240, and the operating level of the memory 430, as represented by the memory activity data 250, are relatively balanced such that the absolute value of the difference between the graphics engine activity data 240 and the memory activity data 250 is less than the balance threshold data 280, then no change in the operating frequency of the graphics engine clock signal 270 or the memory clock signal 272 is required. Accordingly, processing may either end at step 599 or may return to step 520. Alternatively, if the variable information generator 230 determines that the relative difference between the graphics engine activity data 240 and the memory activity data is within the balance threshold data 280, then steps 560 and 592 may be skipped and processing may either end at step 599 or may return to step 520.

As shown in step 594, the variable clock information generator 230 determines if the operating frequency of the memory clock signal 272 was previously reduced. As shown in step 596, if the operating frequency of the memory clock signal 272 was not previously reduced, then the variable clock information generator 230 reduces the operating frequency of the graphics engine clock signal 270. According to this scenario, the memory activity data 250 is essentially indicating that the memory 430 is processing more busy cycles than the graphics engine 448 and therefore the graphics engine 448 is processing more idle cycles than the memory 430. As a result, the variable clock information generator 230 reduces the operating frequency of the graphics engine clock signal 270 in order to reduce the processing capacity of the graphics engine 448 and to avoid operating the graphics engine 448 at an unnecessarily high level.

As shown in step 598, the variable clock information generator 230 increases the operating frequency of the memory clock signal 272 when the memory activity data 250 is greater than a sum of the graphics engine activity data 240 and the balance threshold data 280. Although processing is shown to end at step 599, processing may continue at any suitable step including, for example, step 520.

According to one embodiment, the balance threshold data 280 is programmed into the balance threshold register 454. For example, the processor 410 may program the balance threshold data 280 into the balance threshold data register 454 during power up initialization, as is known in the art. The variable clock information generator 230 may change the balance threshold data in the balance threshold data register 480 based on the specific applications operating on the graphics engine 448 and the memory 430. Accordingly, when the variable clock information generator 230 is initialized, the variable clock information generator 230 may read the balance threshold data 280 from the balance threshold data register 454 and then appropriately determine if the graphics engine activity data 240 and the memory activity data 250 are balanced.

Among other advantages, the variable clock information generator 230 effectively balances the operating level of the graphics engine 448 and of the memory 430 such that neither the graphics engine 448 not the memory 430 consumes power unnecessarily. As a result, the graphics engine 448 does not operate at a level higher than the operating level of the memory 430 and similarly the memory 430 does not operate at a level that is higher than the graphics engine 448 since the operation levels of the graphics engine 448 and the memory 430 are relatively balanced. By balancing the operating level of the graphics engine 448 and the memory 430, neither the graphics engine 448 nor the memory 430 operate at an unnecessarily high level, thus reducing overall power consumption. In other words, the variable clock information generator 230 may vary the operating levels of the graphics engine 448 and the memory 430 in order to adapt to the varying levels of workload such that an appropriate amount of power is supplied to the graphics engine 448 and the memory 430 in accordance to their respective work load demands. As a result, the variable clock information generator 230 reduces power consumption and therefore further increases battery life in a portable computer and reduces thermal dissipation.

It is understood that the implementation of other variations and modifications of the present invention and its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

The invention claim is:

1. A clock control circuit comprising:
a variable clock control information generator operative to receive graphics engine activity data and memory activity data and in response:
produce graphics engine clock control information and in response control an operating frequency of a graphics engine clock signal; and
produce memory clock control information and in response control an operating frequency of a memory clock signal, wherein the graphics engine clock signal and the memory clock signal are controlled with respect to each other such that a relative difference between the received graphics engine activity data and the received memory activity data is within balance threshold data to represent a balanced relative activity level.

2. The clock control circuit of claim 1 wherein the variable clock control information generator is operative in response to detecting a power consumption reduction mode to:
vary the graphics engine clock control information and in response reduce the operating frequency of the graphics engine clock signal when the received memory activity data exceeds a sum of the received graphics engine activity data and the balance threshold data; and
vary the memory clock control information and in response reduce the operating frequency of the memory clock signal when the received graphics engine activity data exceeds a sum of the received memory activity data and the balance threshold data.

3. The clock control circuit of claim 1 wherein the variable clock control information generator is operative in response to detecting a performance enhancement mode to:
vary the graphics engine clock control information and in response increase the operating frequency of the graphics engine clock signal when the received graphics engine activity data exceeds a sum of the received memory activity data and the balance threshold data; and
vary the memory clock control information and in response increase the operating frequency of the memory clock signal when the received memory activity data exceeds a sum of the received graphics engine activity data and the balance threshold data.

4. The clock control circuit of claim 1 wherein the variable clock control information generator is operative to vary at least one of: (a) the graphics engine clock control information and in response vary the operating frequency of the graphics engine clock signal to include at least one intermediate frequency over a transition time period and (b) the memory clock control information and in response vary the operating frequency of the memory clock signal to include at least one intermediate frequency over the transition time period.

5. The clock control circuit of claim 1 wherein the variable clock control information generator is operative to periodically vary at least one of: (a) the graphics engine clock control information and in response vary the operating frequency of the graphics engine clock signal and (b) the memory clock control information and in response vary the operating frequency of the memory clock signal, in response to a determination of when the relative difference between the received graphics engine activity data and the received memory activity data exceeds the balance threshold data.

6. A clock control system comprising:
memory containing instructions executable by a processor that causes the processor to receive graphics engine activity data and memory activity data and in response:
produce graphics engine clock control information and in response control an operating frequency of a graphics engine clock signal;
produce memory clock control information and in response control an operating frequency of a memory clock signal, wherein the graphics engine clock signal and the memory clock signal are controlled with respect to each other such that a relative difference between the received graphics engine activity data and the received memory activity data is within balance threshold data to represent a balanced relative activity level;
a graphics processor including:
a graphics engine activity data register, operatively coupled to the processor, and operative to provide the graphics engine activity data;
a graphics engine clock control information register, operatively coupled to the processor, and operative to receive the graphics engine clock control information;
a memory clock control information register, operatively coupled to the processor, and operative to receive the memory clock control information;
a memory activity data register, operatively coupled to the processor, and operative to provide the memory activity data; and
a balance threshold data register, operatively coupled to the processor, and operative to provide the balance threshold data.

7. The clock control system of claim 6 wherein the memory contains instructions that causes the processor, in response to a detected power consumption reduction mode, to:
vary the graphics engine clock control information and in response reduce the operating frequency of the graphics engine clock signal when the received memory activity data exceeds a sum of the received graphics engine activity data and the balance threshold data; and
vary the memory clock control information and in response reduce the operating frequency of the memory clock signal when the received graphics engine activity data exceeds a sum of the received memory activity data and the balance threshold data.

8. The clock control system of claim 6 wherein the memory contains instructions that causes the processor, in response to a detected performance enhancement mode, to:
vary the graphics engine clock control information and in response increase the operating frequency of the graphics engine clock signal when the received graphics engine activity data exceeds a sum of the received memory activity data and the balance threshold data; and
vary the memory clock control information and in response increase the operating frequency of the memory clock signal when the received memory activity data exceeds a sum of the received graphics engine activity data and the balance threshold data.

9. The clock control system of claim 6 wherein the memory contains instructions that causes the processor to vary at least one of: (a) the graphics engine clock control information and in response vary the operating frequency of the graphics engine clock signal to include at least one intermediate frequency over a transition time period and (b) the memory clock control information and in response vary the operating frequency of the memory clock signal to include at least one intermediate frequency over the transition time period.

10. The clock control system of claim 6 wherein the memory contains instructions that causes the processor to periodically vary at least one of: (a) the graphics engine clock control information and in response vary the operating frequency of the graphics engine clock signal and (b) the memory clock control information and in response vary the operating frequency of the memory clock signal, in response to a determination of when the relative difference between the received graphics engine activity data and the received memory activity data exceeds the balance threshold data.

11. The clock control circuit of claim 6 wherein the graphics processor includes:
a graphics engine activity data generator, operatively coupled to the graphics engine activity register, and operative to receive engine queue size data and in response to produce the graphics engine activity data based on an average of the engine queue size data determined over a period of time;
a graphics engine clock signal generator, operatively coupled to the graphics engine clock control information register, and operative to receive the graphics engine clock control information and in response to produce the graphics engine clock signal;
a memory activity data generator, operatively coupled to the memory activity data register, and operative to receive memory queue size data and in response to produce the memory activity data based on an average of the memory queue size data determined over the period of time; and
a memory clock signal generator, operatively coupled to the memory clock control information register and operative to receive the memory clock control information and in response to produce the memory clock signal.

12. The clock control circuit of claim 11 wherein the graphics processor includes:
a memory controller including a memory request buffer, operatively coupled to the memory activity data generator, and operative to receive memory request data and in response to generate buffered memory request data and the memory queue size data;
an additional memory, operatively coupled to the memory request buffer and to the memory clock signal generator and operative to receive the buffered memory request data and the memory clock signal;
a graphics engine command buffer, operatively coupled to the graphics engine activity data generator, and operative to receive graphics engine command data and in response to produce buffered engine command data and the engine queue size data; and
a graphics engine, operatively coupled to the graphics engine command buffer, the graphics engine clock signal generator and the memory request buffer, and operative to receive the graphics engine clock signal, the buffered engine command data and to produce the memory request data.

13. A clock control system comprising:
memory containing instructions executable by a processor that causes the processor to:
receive graphics engine activity data and memory activity data;

in response to the received graphics engine activity data, the received memory activity data and a detected power consumption reduction mode:
vary graphics engine clock control information and in response reduce an operating frequency of a graphics engine clock signal when the received memory activity data exceeds a sum of the received graphics engine activity data and balance threshold data;
vary memory clock control information and in response reduce an operating frequency of the memory clock signal when the received graphics engine activity data exceeds a sum of the received memory activity data and the balance threshold data; and
in response to the received graphics engine activity data, the received memory activity data and a detected performance enhancement mode:
vary the graphics engine clock control information and in response increase the operating frequency of the graphics engine clock signal when the received graphics engine activity data exceeds a sum of the received memory activity data and the balance threshold data; and
vary the memory clock control information and in response increase the operating frequency of the memory clock signal when the received memory activity data exceeds a sum of the received graphics engine activity data and the balance threshold data.

14. The clock control system of claim 13 including:
a graphics processor including:
a graphics engine activity data register, operatively coupled to the processor, and operative to produce the graphics engine activity data;
a graphics engine clock control information register, operatively coupled to the processor, and operative to receive the graphics engine clock control information;
a memory clock control information register, operatively coupled to the processor, and operative to receive the memory clock control information;
a memory activity data register, operatively coupled to the processor, and operative to produce the memory activity data; and
a balance threshold data register, operatively coupled to the processor, and operative to produce the balance threshold data.

15. The clock control system of claim 13 wherein the memory contains instructions that causes the processor to vary at least one of: (a) the graphics engine clock control information and in response vary the operating frequency of the graphics engine clock signal to include at least one intermediate frequency over a transition time period and (b) the memory clock control information and in response vary the operating frequency of the memory clock signal to include at least one intermediate frequency over the transition time period.

16. The clock control system of claim 13 wherein the memory contains instructions that causes the processor to periodically vary at least one of: (a) the graphics engine clock control information and in response vary the operating frequency of the graphics engine clock signal and (b) the memory clock control information and in response vary the operating frequency of the memory clock signal, in response to a determination of when the relative difference between the received graphics engine activity data and the received memory activity data exceeds the balance threshold data.

17. A power consumption reduction method comprising:
receiving graphics engine activity data;
receiving memory activity data; and
producing: (a) graphics engine clock control information and in response varying an operating frequency of a graphics engine clock signal and (b) memory clock control information and in response varying an operating frequency of a memory clock signal with respect to each other, in response to receiving the graphics engine activity data and the memory activity data such that a relative difference between the received graphics engine activity data and the received memory activity data is within balance threshold data to represent a balanced relative activity level.

18. The method of claim 17, in response to detecting a power consumption reduction mode, including:
varying the graphics engine clock control information and in response reducing the operating frequency of the graphics engine clock signal when the received memory activity data exceeds a sum of the received graphics engine activity data and the balance threshold data; and
varying the memory clock control information and in response reducing the operating frequency of the memory clock signal when the received graphics engine activity data exceeds a sum of the received memory activity data and the balance threshold data.

19. The method of claim 17, in response to detecting a performance enhancement mode, comprising:
varying the graphics engine clock control information and in response increasing the operating frequency of the graphics engine clock control information when the graphics engine activity data exceeds a sum of the memory activity data and the balance threshold data; and
varying the memory clock control information and in response increasing the operating frequency of the memory clock control information when the received memory activity data exceeds a sum of the received graphics engine activity data and the balance threshold data.

20. The method of claim 17 further including varying at least one of: (a) the graphics engine clock control information and in response varying the operating frequency of the graphics engine clock signal to include at least one intermediate frequency over a transition time period and (b) the memory clock control information and in response varying the operating frequency of the memory clock signal to include at least one intermediate frequency over the transition time period.

21. The method of claim 17 further including periodically varying at least one of: (a) the graphics engine clock control information and in response varying the operating frequency of the graphics engine clock signal and (b) the memory clock control information and in response varying the operating frequency of the memory clock signal, in response to a determination of when the relative difference between the received graphics engine activity data and the received memory activity data exceeds the balance threshold data.

22. The method of claim 17 including:
generating the graphics engine activity data based on an average of engine queue size data determined over a period of time; and
generating the memory activity data based on an average of memory queue size data determined over the period of time.

23. A power consumption reduction method comprising:
receiving graphics engine activity data;
receiving memory activity data;

detecting at least one of a power consumption reduction mode and a performance enhancement mode;

in response to detecting the power consumption mode:

varying graphics engine clock control information and in response reducing an operating frequency of the graphics engine clock signal when the received memory activity data exceeds a sum of the received graphics engine activity data and balance threshold data;

varying memory clock control information and in response reducing an operating frequency of the memory clock signal when the received graphics engine activity data exceeds a sum of the received memory activity data and the balance threshold data;

in response to detecting performance enhancement mode:

varying the graphics engine clock control information and in response increasing the operating frequency of the graphics engine clock control information when the received graphics engine activity data exceeds a sum of the received memory activity data and the balance threshold data; and varying the memory clock control information and in response increasing the operating frequency of the memory clock control information when the received memory activity data exceeds a sum of the received graphics engine activity data and the balance threshold data.

24. The method of claim 23 further including varying at least one of: (a) the graphics engine clock control information and in response varying the operating frequency of the graphics engine clock signal to include at least one intermediate frequency over a transition time period and (b) the memory clock control information and in response varying the operating frequency of the memory clock signal to include at least one intermediate frequency over the transition time period.

25. Memory containing instructions executable by one or more processing devices that causes the one or more processing devices to:

receive graphics engine activity data;

receive memory activity data; and produce: (a) graphics engine clock control information and in response vary an operating frequency of a graphics engine clock signal and (b) memory clock control information and in response vary an operating frequency of a memory clock signal with respect to each other, in response to the received graphics engine activity data and the received memory activity data such that a relative difference between the received graphics engine activity data and the received memory activity data is within balance threshold data to represent a balanced relative activity level.

26. The memory of claim 25 containing executable instructions that causes the one or more processing devices to vary at least one of: (a) the graphics engine clock control information and in response vary the operating frequency of the graphics engine clock signal to include at least one intermediate frequency over a transition time period and (b) the memory clock control information and in response vary the operating frequency of the memory clock signal to include at least one intermediate frequency over the transition time period.

* * * * *